United States Patent [19]

Chen et al.

[11] Patent Number: 5,133,597
[45] Date of Patent: Jul. 28, 1992

[54] METHOD AND DEVICE FOR MEASURING THE TRANSMISSION LOSS AND OPTICAL WAVEGUIDE

[75] Inventors: San M. Chen; Seng B. Huang, both of Hsin Chu, Taiwan

[73] Assignee: Industrial Technology Research Institute, Hsin Chu, Taiwan

[21] Appl. No.: 633,995

[22] Filed: Dec. 26, 1990

[51] Int. Cl.$^5$ .................... G01N 21/84; G01N 21/59
[52] U.S. Cl. ................................................. 356/73.1
[58] Field of Search ........................................ 356/73.1

[56] References Cited

FOREIGN PATENT DOCUMENTS 54-58044  5/1979  Japan .................................. 356/73.1
61-223528 10/1986 Japan .................................. 356/73.1

OTHER PUBLICATIONS

Won et al., "Three-Prism Loss Measurements of Optical Waveguides", Appl. Phys. Lett. 37(3), Aug. 1, 1980, pp. 269–271.

*Primary Examiner*—Vincent P. McGraw
*Attorney, Agent, or Firm*—Spencer, Frank & Schneider

[57] ABSTRACT

A device and method for measuring transmission loss in an optical waveguide. The device includes a base on which an optical waveguide can be secured. A first clamp is mounted on the base so that the first clamp can be fixed relative to the secured waveguide. The first clamp secures the first prism for coupling with the waveguide so that the first prism can guide light to enter the waveguide. A second clamp is mounted on the base so that the second clamp can alternatively be fixed or shifted relative to the waveguide. A second prism is secured to the second clamp for coupling with the waveguide so that part of the light in the waveguide exits by way of the second prism. Also provided is a device for adjusting the distance between the first and second prisms, a first sensor for detecting the optical power of the light exited from the waveguide through the second prism and a second sensor for detecting the optical power of the light exiting the waveguide through the waveguide's rear end face.

5 Claims, 14 Drawing Sheets

METHOD AND DEVICE FOR MEASURING THE TRANSMISSION LOSS AND OPTICAL WAVEGUIDE

CROSS REFERENCE TO RELATED APPLICATIONS

The present invention relates to the subject matter of Taiwan application No. 79104470.

BACKGROUND OF THE INVENTION

The present invention relates generally to a method and a device for measuring the transmission loss in an optical waveguide, and particularly to a method and a device for measuring the transmission loss in an optical waveguide in an efficient way.

Optical waveguides for transmitting light wave are commonly used in integrated optical circuitries and optical communication systems, and the transmission loss in the optical waveguides are directly in relation to the performances of the circuitries and the communication systems. Accordingly, it is desirable to have a technique for efficiently measuring the transmission loss in an optical waveguide.

One conventional method, called the end fire guide-in/guide-out method, for measuring the transmission loss in an optical waveguide, includes coupling an incident light wave into an optical waveguide from a well-finished end face of the waveguide to let the light wave propagate through the waveguide, then coupling the light wave out of the waveguide from the opposite end face. By measuring the powers of the incident light wave and the outgoing light wave, we can obtain the transmission loss in the light wave. However, an optical waveguide is very thin, so that it is not easy to couple a light wave into the end face of the waveguide. Furthermore, the processing of cutting, polish, and lapping of the end face of the optical waveguide is time-consuming work. Besides, transmission loss in an optical waveguide can only be measured at its full length, and it is impossible to measure transmission losses at different locations of the same waveguide.

To overcome the disadvantages of the above-mentioned method, another method for measuring the transmission loss in an optical waveguide was suggested. As shown in FIG. 1, an incident light wave is coupled into a waveguide film 113 by way of a prism 115a which is coupled to the waveguide 113, and after propagating through certain distance, the light wave is coupled out of the waveguide 113 by way of another prism 115 coupled to the same waveguide 113.

However, the measurement result of the second method is dependent on the coupling coefficient between the prism and the waveguide, and the coupling coefficient is a function of the coupling force exerted on the waveguide by the prism. It is very difficult to keep all of the coupling forces at a constant value during measurements of the transmission loss in the films. Thus, the transmission losses in waveguide films of different lengths have not been precisely measured.

To eliminate the bad influences of the coupling coefficients, a third method is disclosed by Y. H. Won, P. C. Jaussand, and G. H. Chartier in a paper titled "Three-prism loss measurements of optical waveguides" of "Applied Physics Letters 37(3)" published on Aug. 1, 1980. As shown in FIG. 2, an incident light wave is coupled into the waveguide 13a by way of a prism 1, and the light wave propagating in the waveguide 13a is coupled respectively out of the waveguide 13a by way of a prism 2 and a prism 3. That is to say, a moveable prism 2 for guiding part of the incident light wave out of the waveguide 13a is disposed between the prism 1 and prism 3. Let P2 and P3 be the output powers of light waves coming out, respectively, from the prism 2 and the prism 3; r2 and r3 be the coupling coefficients, respectively, when the prisms 2 and 3 are coupled to the waveguide 13a; I(Z) be the intensity of the light wave propagating in the waveguide; Z be the location of the prism; $\alpha$ be the attenuation coefficient of the waveguide, then we will obtain the following equations $$P2 = r2 * I(Z2) \quad\quad\quad (1)$$

$$P3 = r3 * [I(Z2) - P2] \exp[-\alpha(Z3 - Z2)] \quad\quad (2)$$

When r2=0, we will obtain P3=P30. When r2≠0, we will obtain P3=P30−ΔP3.

Using the above two equations (1), (2), we can eliminate r2 and r3 and obtain the following equation $$I(Z) = (P2 * P30)/\Delta P3 = (P2 * P30)/(P30 - P3) \quad (3)$$

It is possible to obtain the intensity of light wave propagating in the waveguide by using only the output powers P2, P3 of light waves coming out from the prism 2 and the prism 3, and thus the intensity of light wave propagating in the waveguide is independent of the coupling coefficients r2 and r3. If all the conditions surrounding the waveguide are kept constant, the transmission losses in the waveguide at different lengths can be measured by only moving the movable prism 2 and coupling it to the waveguide 13a at corresponding locations. However, three prisms should be used in the above method. It is necessary to space two prisms 2, 3 at a proper distance for guiding out the light wave out from the prism 2, thus the space left for the moving of the prism 2 is limited. Furthermore, the above method does not disclose any detailed mechanism for keeping the coupling coefficients constant.

SUMMARY OF THE INVENTION

The primary object of the present invention is to provide a method for measuring transmission loss in an optical waveguide with constant coupling coefficient, so that a precise measurement can be acquired.

It is another object of this invention to provide a method for measuring transmission loss in an optical waveguide to its largest extent of length.

The above objects can be achieved by a method for measuring transmission loss in an optical waveguide, which method comprises:

(1) securing the optical waveguide to a base;

(2) driving a first couple prism to contact the optical waveguide so as to couple the first couple prism to the optical waveguide;

(3) directing a light wave to enter the optical waveguide by way of the first couple prism, and detecting the optical power P30 of the light wave coming out from the rear end face of the optical waveguide;

(4) driving a second couple prism with a constant force to contact the optical waveguide so as to couple the second couple prism to the optical waveguide at a distance Z1 from the first couple prism, and detecting the optical power P2 of the light wave coming out from the second couple prism;

(5) detecting the optical power P3 of the light wave coming out from the rear end face of the optical waveguide when the second coupled prism is coupling with the optical waveguide at the distance Z1;

(6) calculating the optical intensity I (Z1) of the light wave passing through the optical waveguide the distance Z1, by using the equation $$I(Z1) = (P30 * P2)/(P30 - P3)$$

(7) driving the second couple prism to move apart from the optical waveguide, and coupling the second couple prism again with the optical waveguide at a distance Z2 from the first couple prism, and detecting the optical power P2' of the light wave coming out from the second couple prism;

(8) detecting the optical power P3' of the light wave coming out from the rear end face of the optical waveguide when the second couple prism is coupling with the optical waveguide at the distance Z2;

(9) calculating the optical intensity I (Z2) of the light wave passing through the optical waveguide at the distance Z2 by using the equation $$I(Z2) = (P30 * P2')/(P30 - P3'); \text{ and}$$

(10) calculating the transmission loss L by using the equation $$L = 10 * (LOG I(Z1)/LOG I(Z2)).$$

The above objects can be achieved by a device for measuring transmission loss in an optical waveguide, which device comprises:

a base for securing an optical waveguide thereon, the optical waveguide guiding a light wave so that it propagates through the optical waveguide to exit the optical waveguide at an end face thereof;

a first couple prism clamp mounted on the base in such a way that the first couple prism clamp is capable of being fixed relative to the optical waveguide;

a first couple prism secured to the first couple prism clamp, for coupling to the optical waveguide to guide a light wave to enter the optical waveguide;

a second couple prism clamp mounted on the base in such a way that the second couple prism clamp is capable of alternatively being fixed and being shifted relative to the optical waveguide secured to the base;

a second couple prism secured to the second couple prism clamp, for coupling to the optical waveguide so as to guide part of the light wave propagating through the optical waveguide to exit the waveguide by way of the second couple prism;

means for driving the second couple prism alternatively to contact the optical waveguide secured to the base, with a constant magnitude of force, so as to couple the second couple prism to the optical waveguide and to move the second couple prism apart from the optical waveguide so as to become decoupled from the optical waveguide.

means for adjusting the distance between the first couple prism and the second couple prism;

a first sensor for detecting the optical power of the light wave exiting the second couple prism; and a second sensor for detecting the optical power of the light wave exiting the optical waveguide through the end face.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENT

Figure 1:
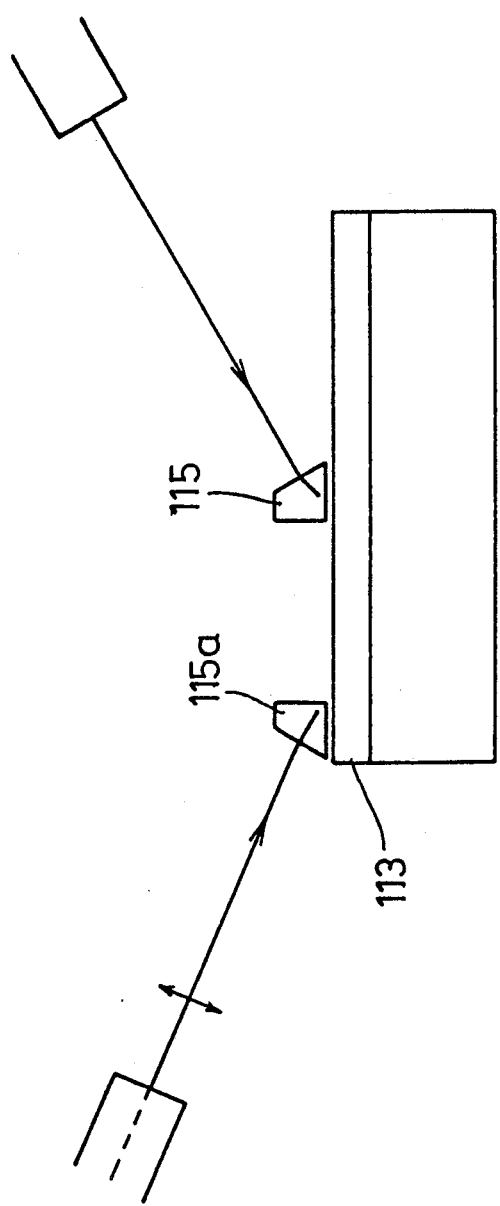
FIG. 1 is a schematic diagram showing a conventional method for measuring transmission loss in an optical waveguide.
Figure 2:
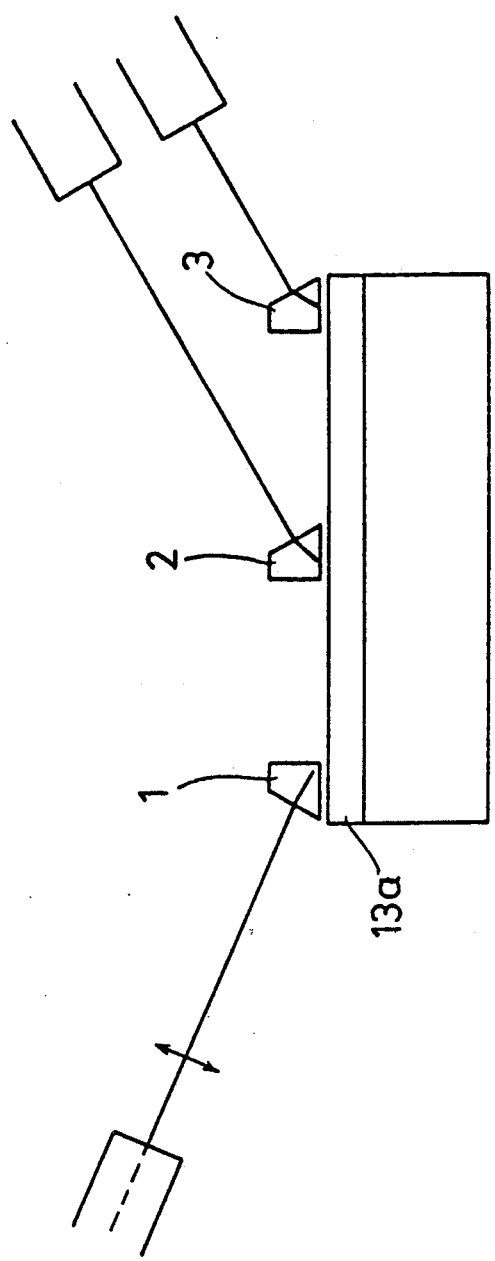
FIG. 2 is a schematic diagram showing another conventional method for measuring transmission loss in an optical waveguide.
Figure 3:
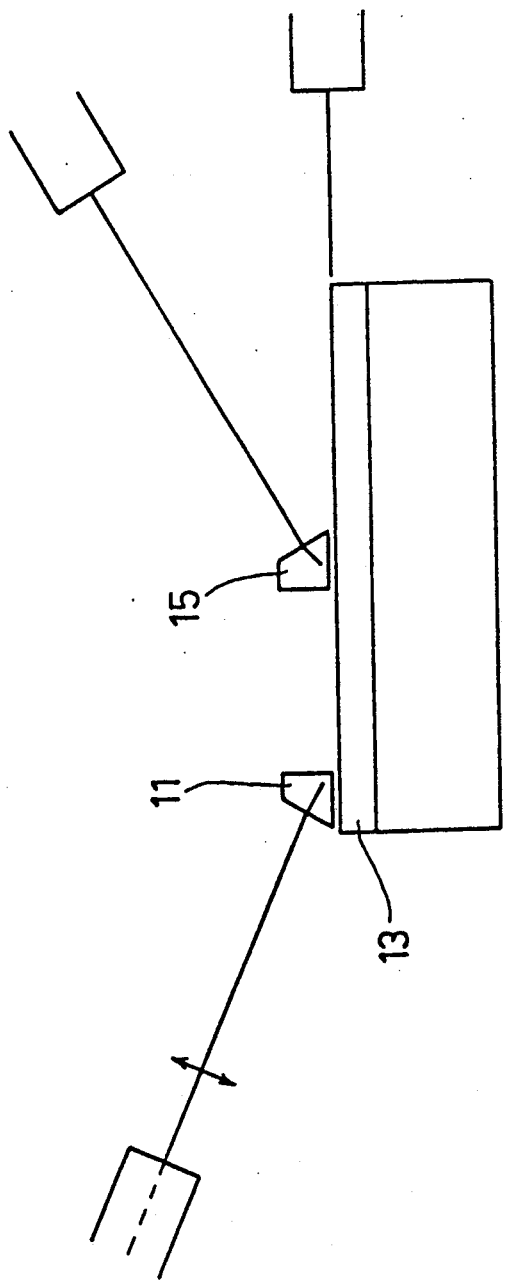
FIG. 3 is a schematic diagram showing the method for measuring transmission loss in an optical waveguide, according to the present invention.

As shown in FIG. 3, a light wave coming from the light source is coupled into the waveguide 13 by way of a first couple prism 11 so as to measure the output power P30 of the light wave at the rear end face of the waveguide 13. It should be noted that at first the second couple prism 15 was not coupled to the waveguide 13. Then, the second couple prism 15 is driven to couple to the waveguide 13 so as to couple part of the light wave out of the waveguide 13 by way of the second couple prism 15. After this, the power P2 of the light wave coming from the second couple prism 15 and the power P3 of the light wave coming from the rear end face of the waveguide 13 are measured. If P2 and P3 are substituted into the equation (3), then we will get $$I(Z) = (P30 * P2)/(P30 - P3)$$

wherein, I(Z) is the intensity of the beam in the waveguide 13, and Z is the distance between the first couple prism 11 and the second couple prism 15 coupling to the waveguide 13.

In order to keep the coupling coefficient constant at each measure, the coupling force should be kept constant at each coupling operation. For this purpose, micrometers 122, 162 are used for urging couple prisms 11, 15 on the waveguide 13 to keep the coupling force constant during measuring operations.

Figure 4:
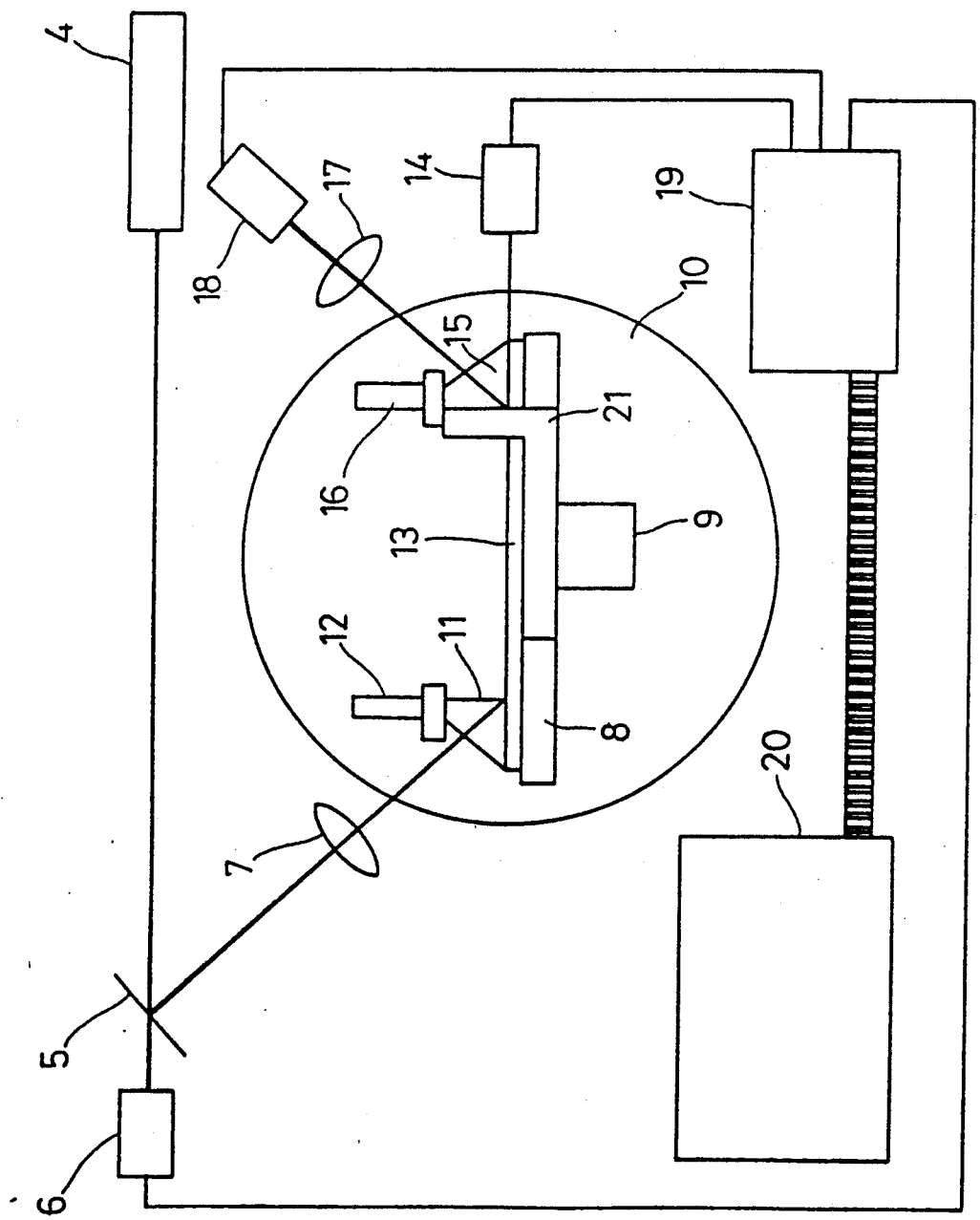
FIG. 4 is a schematic diagram showing the structure of a device for measuring transmission loss in an optical waveguide, according to the present invention.

As shown in FIG. 4, the device, for measuring transmission loss in the waveguide, comprises a base 8, a first couple prism clamp 12 fixed on the base 8, a second couple prism clamp 16 fixed on the base 8, and a transverse micrometer 21. During operation, the incident beam coming from the light wave source 4, which is a He-Ne laser or an IR semi-conductor laser, passes through a beam splitter 5 which divides the light wave into two component beams. One of the component beams is directly guided to a sensor 6 for detecting a reference light wave power Pr; the other one is deflected and penetrates through a focus lens 7 and then enters the first couple prism 11 which is coupled to the waveguide 13 by means of the first couple prism clamp 12 mounted on the base 8.

The base 8 is mounted on a platform which is composed of a translation stage 9 and a rotation stage 10. After adjusting the angular position of the rotation stage 10 and shifting the X-, Y-, Z- axes of the translation stage 9 to their proper positions, the coupling pressure induced between the prism 11 and the waveguide 13 is capable of being adjusted by the first couple prism clamp 12 so that the incident light wave can be coupled into the waveguide 13. After propagating through the waveguide 13, the incident light wave will come out from the rear end face of the waveguide 13, and the power P30 of the light wave coming from the rear end face of the waveguide 13 will be detected by a sensor 14 disposed near the rear end face of the waveguide 13. After this, the second couple prism 15 is coupled to the waveguide 13, and the coupling pressure induced therebetween is adjusted so that part of the light wave propagating through the waveguide 13 can be guided to pass through the second couple prism 15 and a focus lens 17 to reach a sensor 18 for detecting the power P2 of the light wave coming from the second couple prism 15. However, part of the light wave will still propagate through the waveguide 13 to reach the sensor 14, and the power of the light wave coming from the rear end face of the waveguide 13 is decreased from P30 to P3. All of the sensors 6, 14, and 18 are coupled to a power meter 19 which is coupled to a computer 20 for calculating and recording the data detected by the sensors 6, 14, and 18. The micrometer 21 mounted on the base 8 is used for shifting the second couple prism clamp 16 to vary the distance between the first couple prism 11 and the second couple prism 15. If we repeat the above operations by only varying the distances between the first couple prism 11 and the second couple prism 15, then we will obtain the losses (L) of the optical power after propagating different optical path lengths of the same waveguide 13, by using the following equation $$L = 10 * (\text{LOG}(I1)/\text{LOG}(I2)).$$

wherein, I1, I2 are respectively optical intensities at distances Z1, Z2 from the first couple prism 11.

Figure 5:
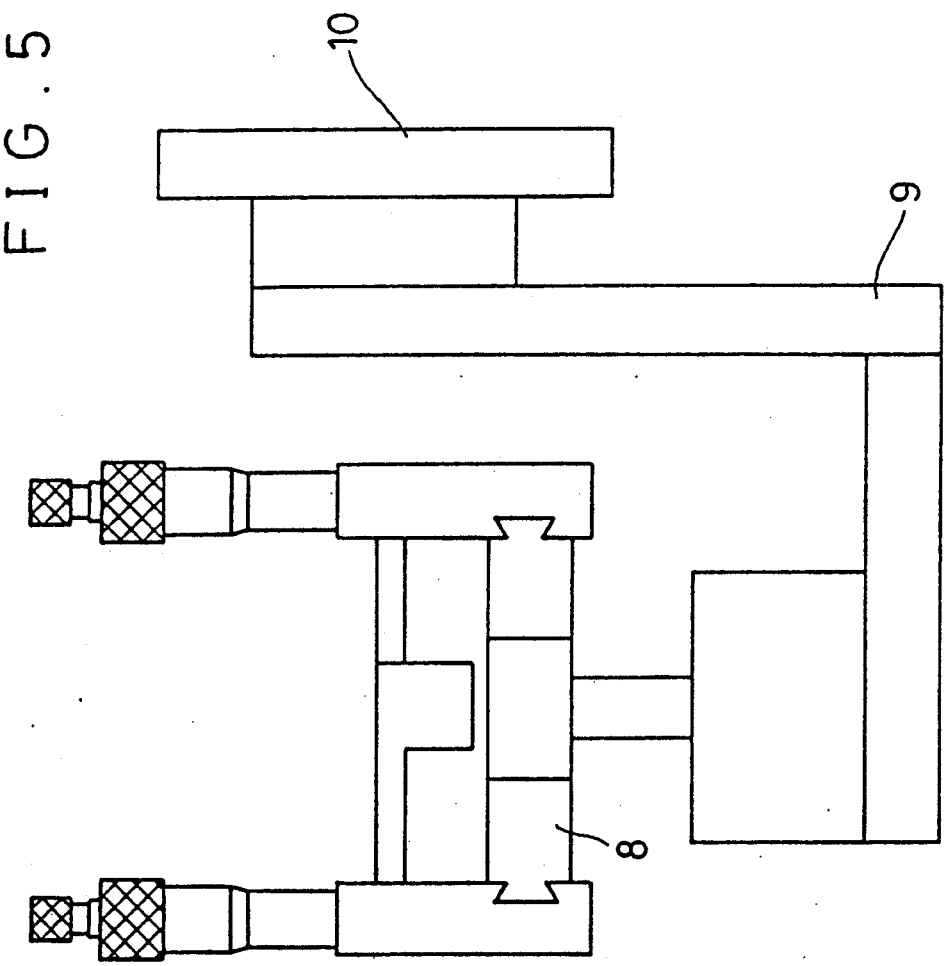
FIG. 5 is a schematic diagram showing a translation stage and a rotation stage of the device for measuring transmission loss in an optical waveguide, according to the present invention.

As shown in FIG. 5, the base 8 is mounted on the translation stage 9 which is engaged with the rotation stage 10; the translation stage 9, and the rotation stage 10 are sold by Newport Corporation (a U.S. company), and we will not describe their detailed constructions here. By adjusting the translation stage 9 and the rotation stage 10, the attitude of the base 8 can be adjusted to match the incident angle of the light wave.

Figure 6A:
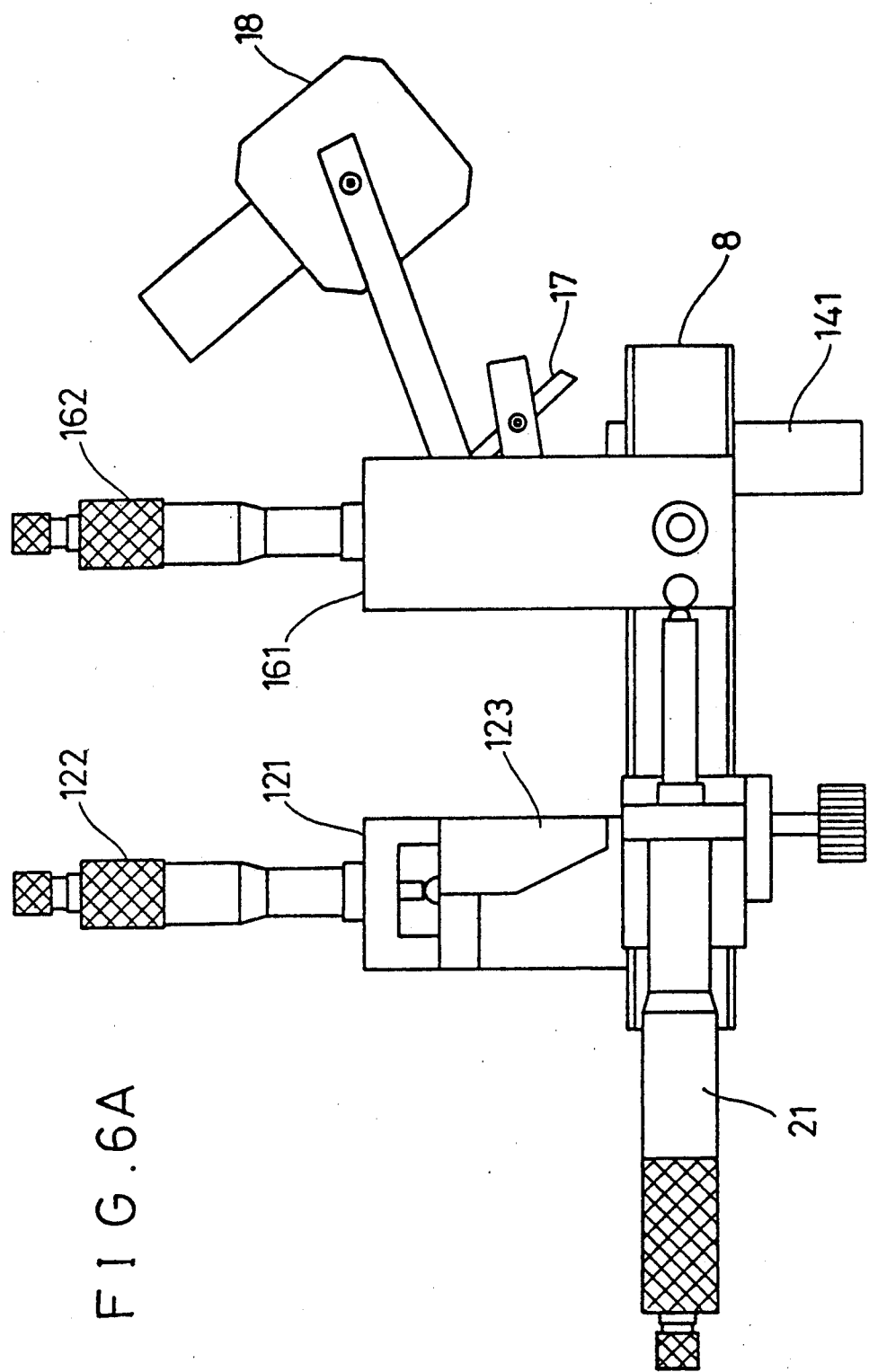
FIG. 6a to FIG. 6c are respectively the front view, top view, and rear view showing the device for measuring transmission loss in an optical waveguide, according to the present invention.
Figure 6B:
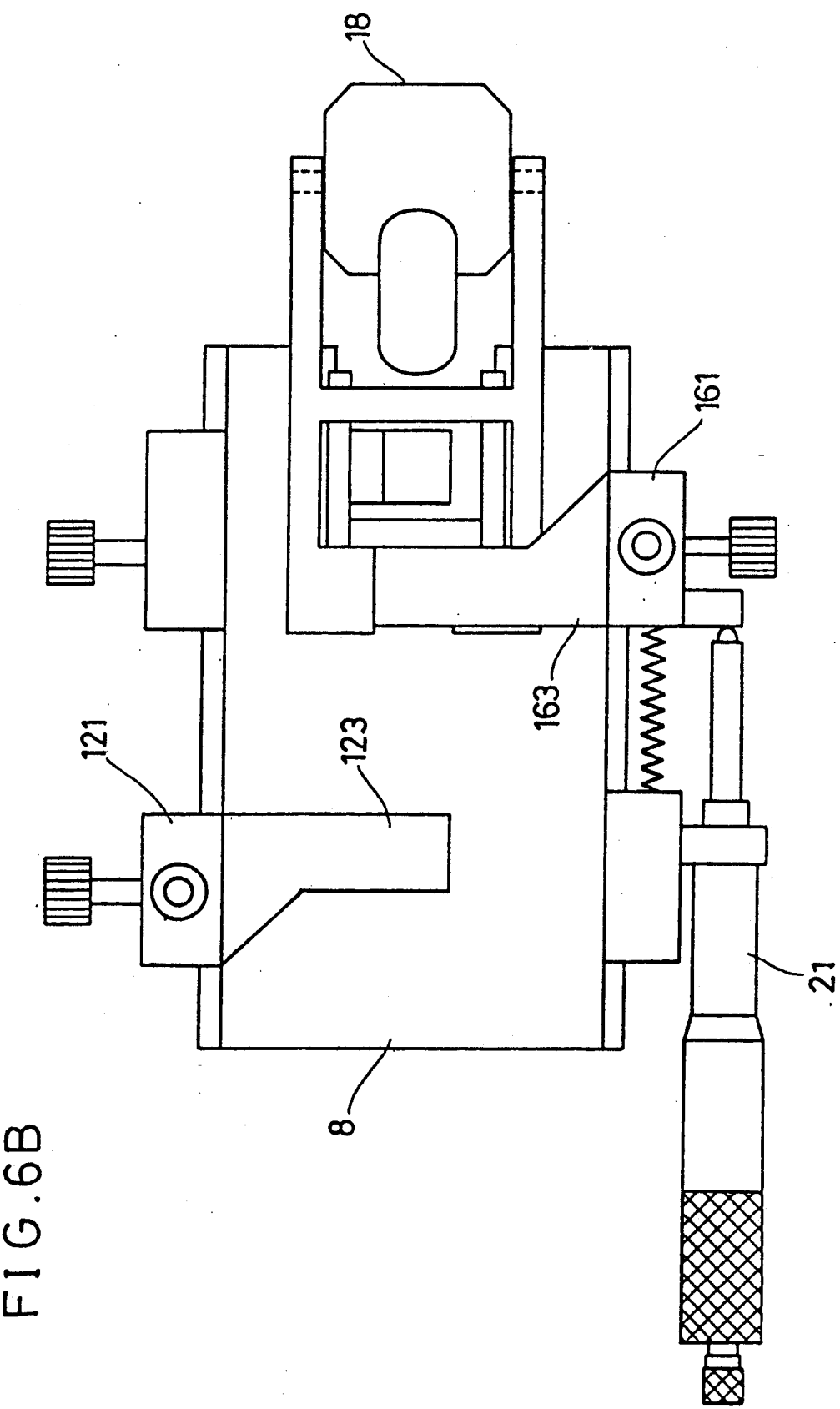
Figure 6C:
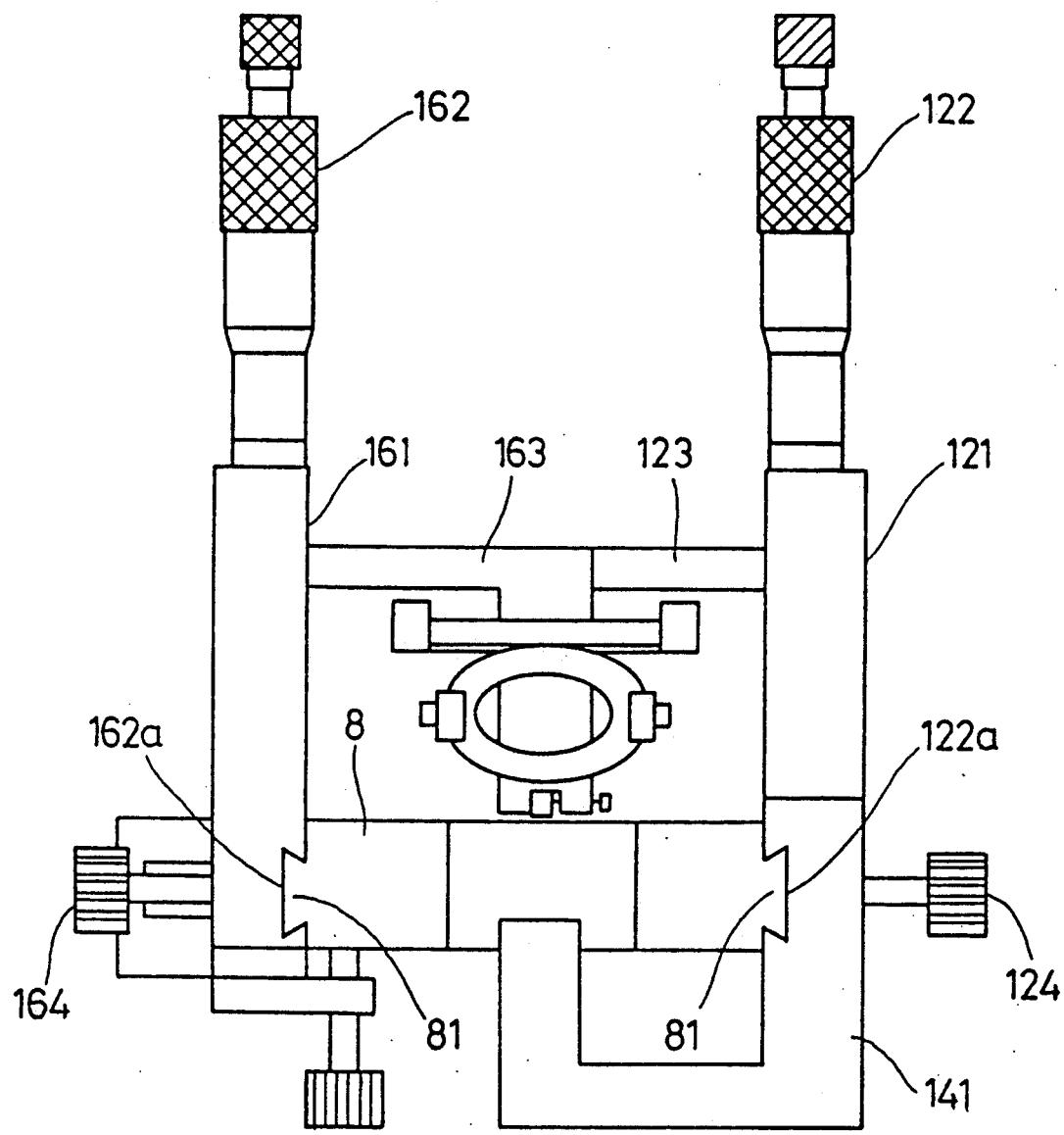
Figure 7:
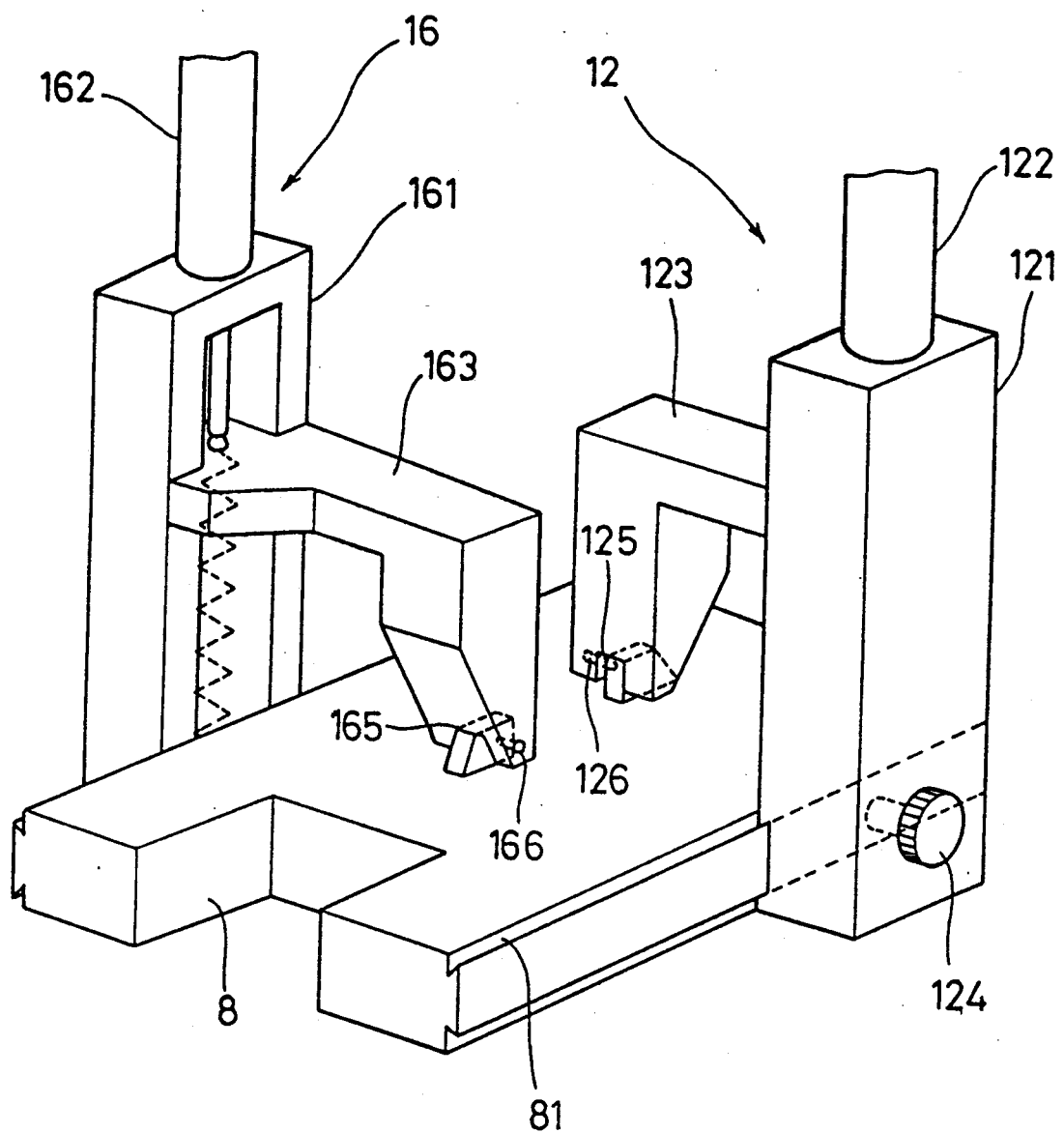
FIG. 7 to FIG. 10b are schematic diagrams showing the structure of main parts of the device for measuring transmission loss in an optical waveguide, according to the present invention.

FIG. 6a to FIG. 6c are respectively the front view, top view, and rear view showing the device for measuring transmission loss in the waveguide 13, according to the present invention. In order to describe the construction in detail, the device for measuring transmission loss is divided into several main parts which are shown respectively in FIG. 7 to FIG. 10b. As shown in FIG. 7, the first couple prism clamp 12 and the second couple prism clamp 16 are respectively composed of a frame 121, 161, a micrometer 122, 162, and a prism holder 123, 163. One pair of guide rails 81 formed on the base 8 (see FIG. 6c) are engaged with slots 122a, 162a of the frames 121, 161, for guiding the sliding movement of the frames 121, 161. Two set screws 124, 164 are provided for temporarily fixing the two frames 121, 161 to the base 8. Two recesses 125, 165 formed respectively on the lower portions of the prism holders 123, 163 are provided for accommodating the two prisms 11, 15, and two screws 126, 166 are provided for securing the two prisms 11, 15 to the prism holders 123, 163. The two prism holders 123, 163 are driven to move upward or downward by the micrometers 122, 162 by means of urging the springs 121a, 161a accommodated within the two frames 121, 161. Thus, two prisms 11, 15 can be driven to couple to the waveguide 13.

Figure 8A:
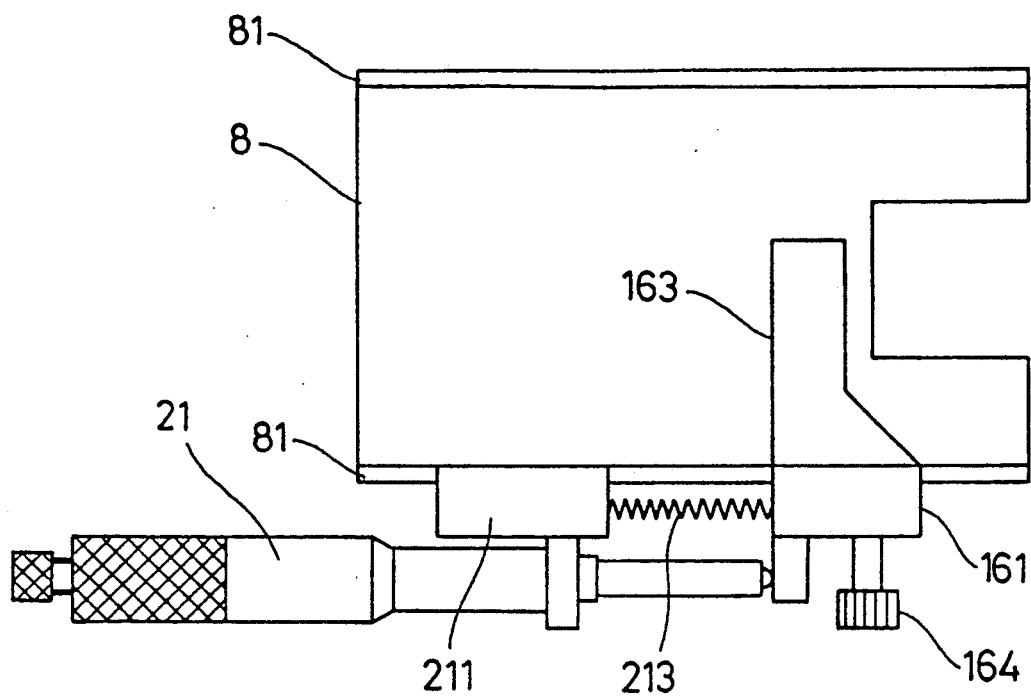
Figure 8B:
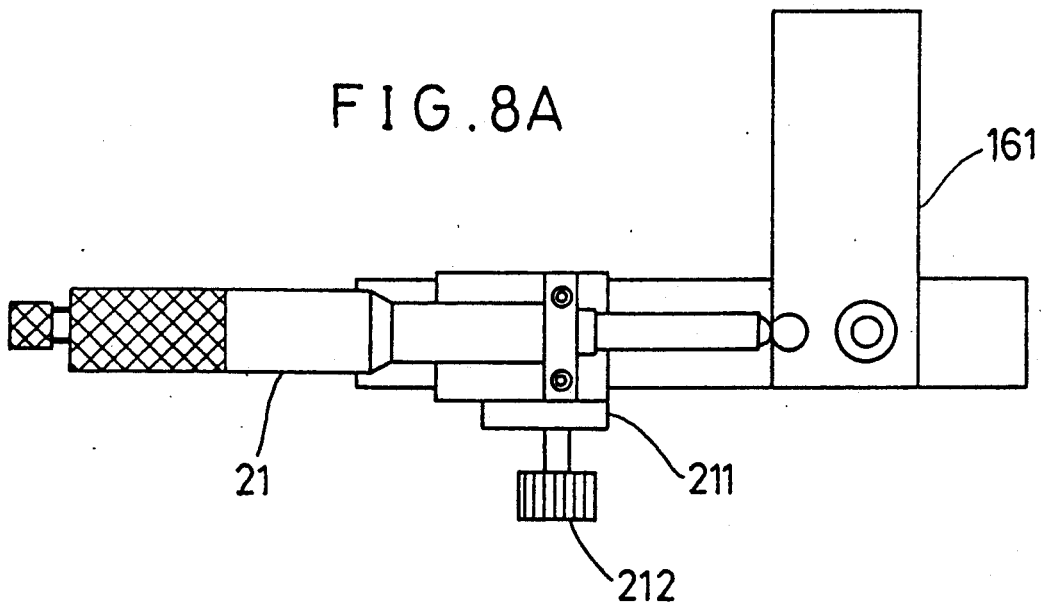

As shown in FIG. 8a and FIG. 8b, the micrometer 21 is secured to one of the guide rails 81 of the base 8 by means of a set screw 212 and a block 211 mounted on the guide rail 81. A spring 213 is restrained between the block 211 and the second couple prism clamp 16, for urging the block 211 and the second couple prism clamp 16 to move apart from each other. Thus, the distance between the first couple prism clamp 12 and the second couple prism clamp 16 can be adjusted by adjusting the micrometer 21.

Figure 9A:
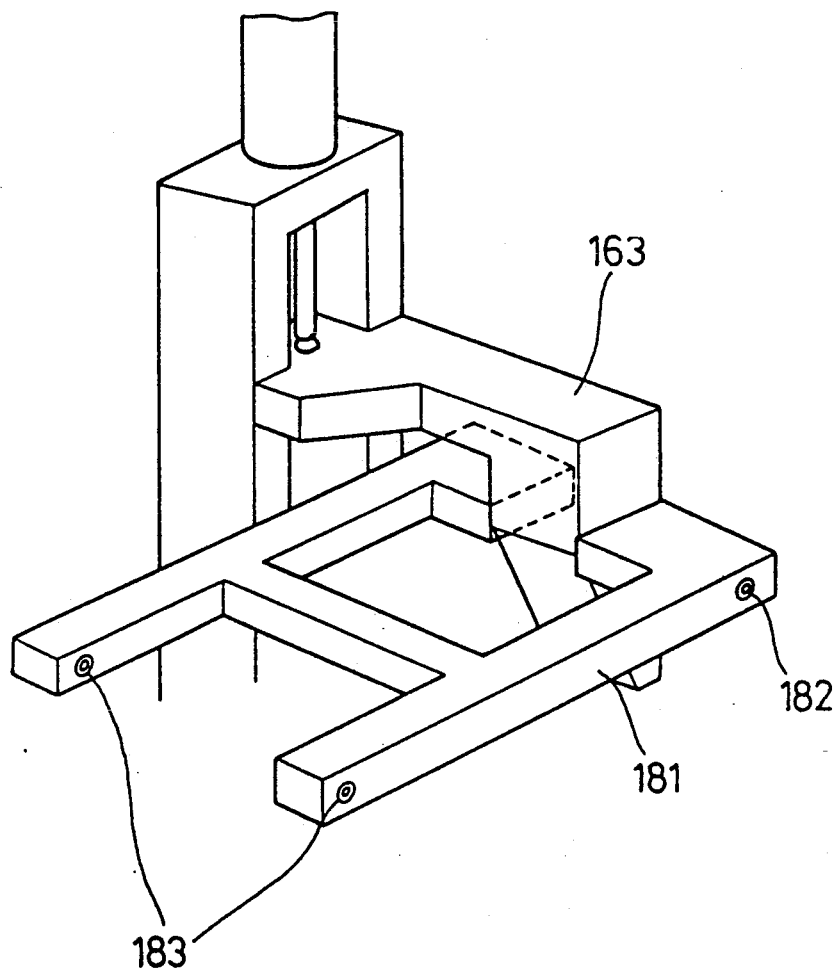
Figure 9B:
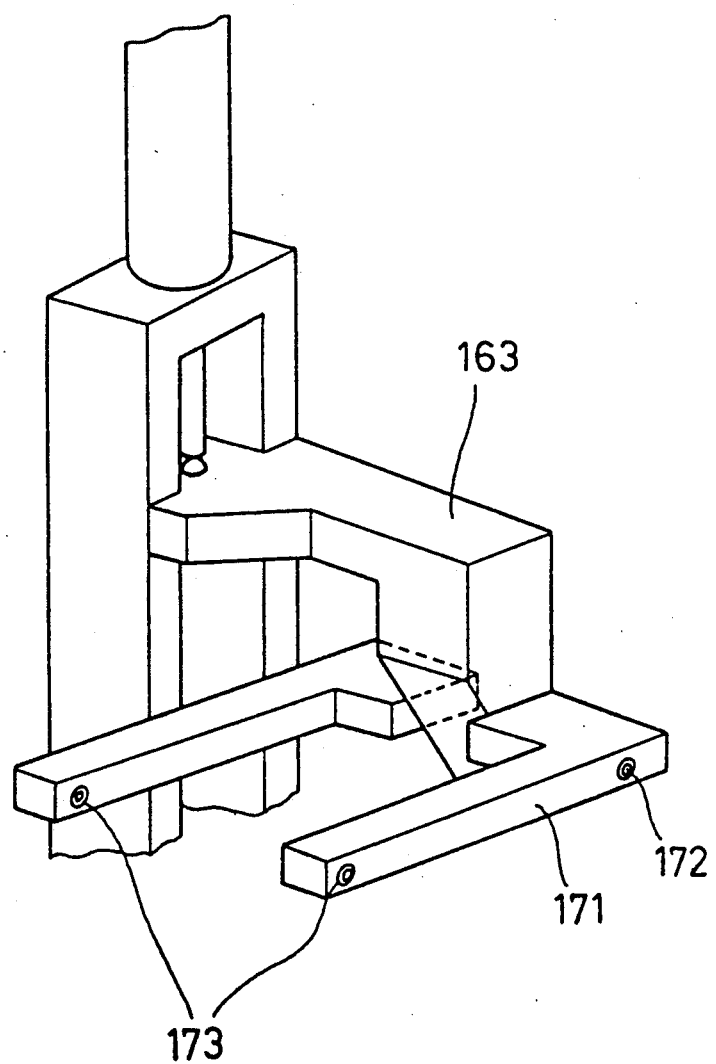

FIG. 9a is a perspective view showing a fix frame 181 for fixing the sensor 18 shown in FIG. 4. As shown in FIG. 9a, the fix frame 181 is secured to the second couple prism holder 163 by means of two set screws 182, and the sensor 18 is secured to the fix frame 181 by means of two set screws 183. FIG. 9b is a perspective view showing a fix frame 171 for fixing the focus lens 17 shown in FIG. 3. As shown in FIG. 9b, the fix frame 171 disposed below the fix frame 181 has structure similar to that of the fix frame 181, so that we omit the descriptions of the structure of the fix frame 171. By this arrangement, the light wave coming from the prism 15 can be easily guided into the sensor 18.

Figure 10A:
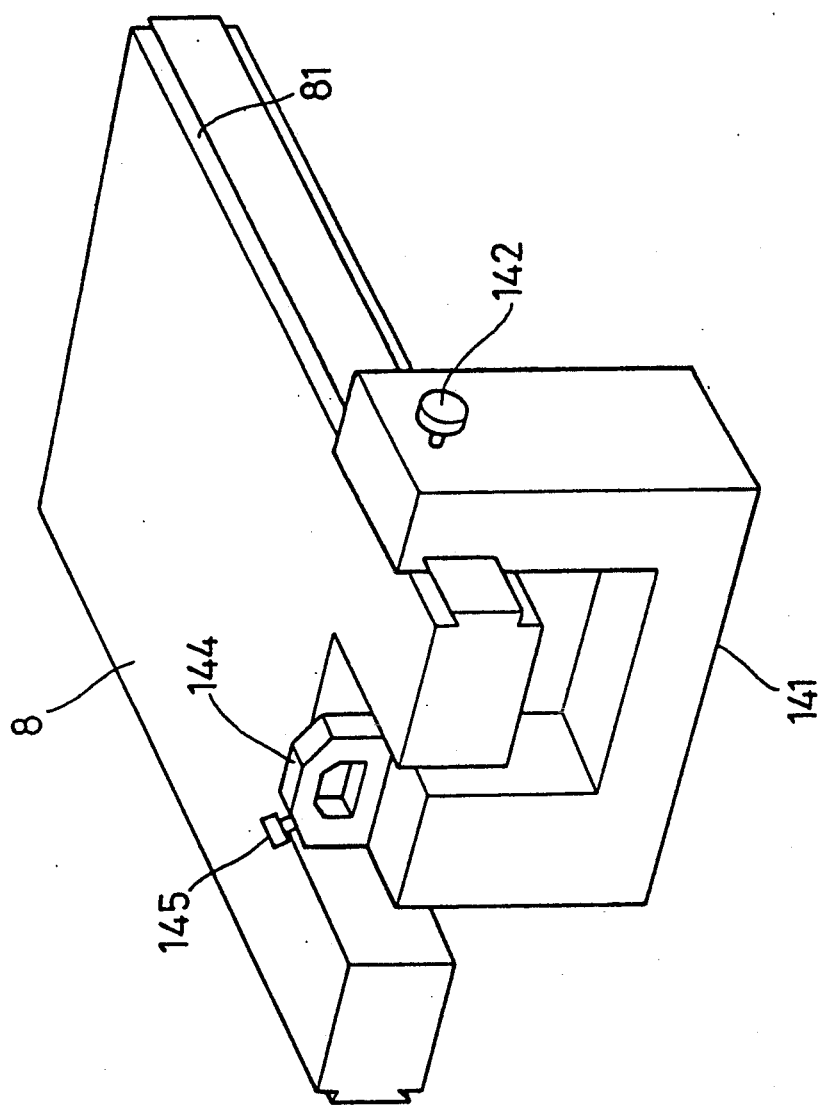

FIG. 10a is a perspective view showing a fix frame 141 for fixing the sensor 14 shown in FIG. 4. The sensor 14 is secured to the central opening of the ring 144 of the fix frame 141 by means of a screw 145, and the fix frame 141 is secured to the guide rail 81 of the base 8 by means of a set screw 142.

Figure 10B:
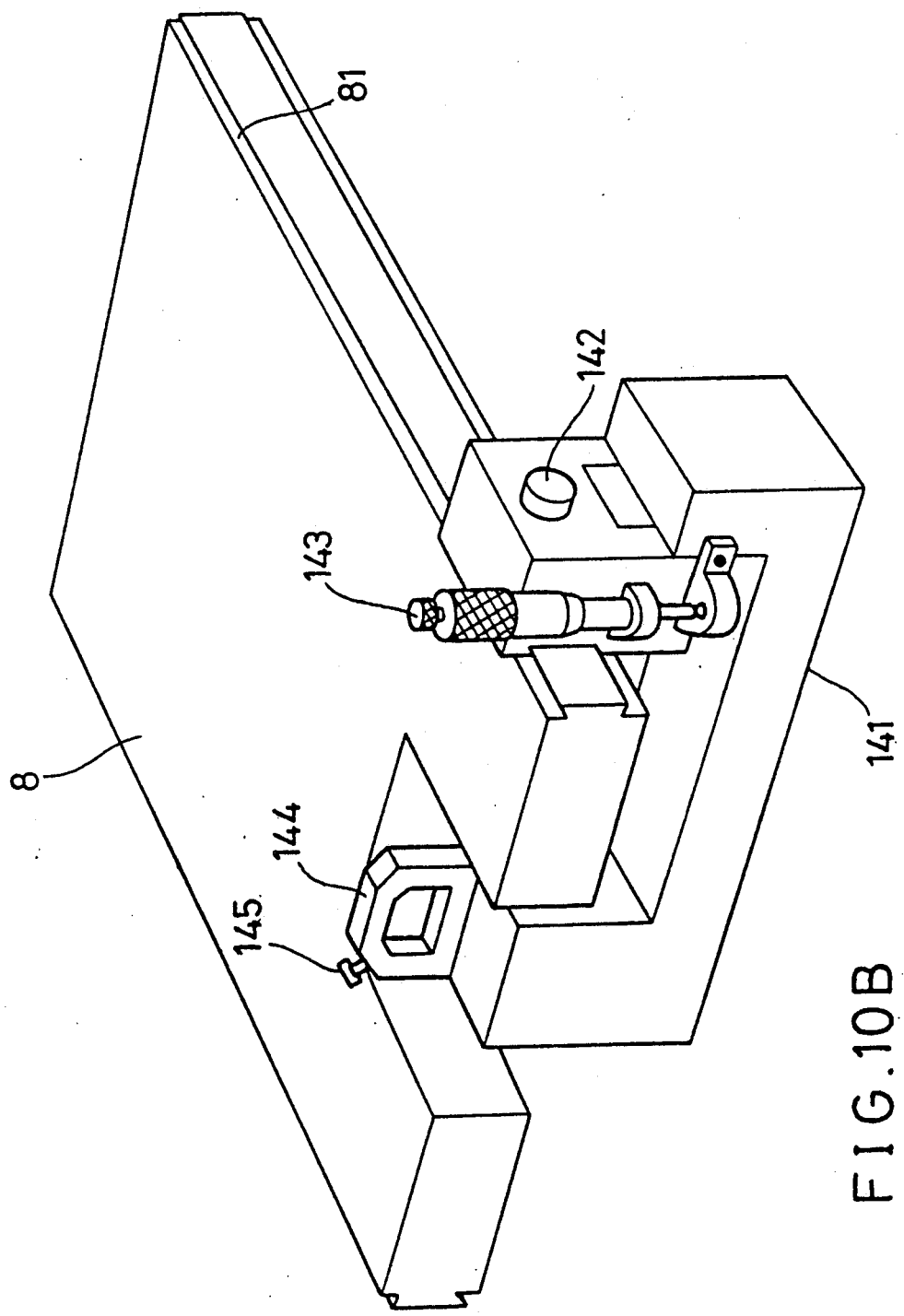

FIG. 10b is a perspective view showing another fix frame 141a for fixing the sensor 14. As shown in FIG. 10b, a micrometer 143 is mounted on the fix frame 141a for driving the upward or downward movement of the fix frame 141a, so that the altitude of the sensor 14 can be adjusted to match films of different thickness to be measured.

As above-described, micrometers 122, 162 are used for urging couple prisms 11, 15 on the waveguide 13 to keep the coupling force constant during measuring operations, so that a precise measurement can be acquired.

Also, instead of using three prisms, two prisms are used for measuring transmission loss in an optical waveguide, so that the measurement of transmission loss can be made to its largest extent.

While the invention has been described in terms of what is presently considered to be the most practical and preferred embodiments, it is to be understood that the invention needs not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A device for measuring transmission loss in an optical waveguide, comprising:
   a base for securing an optical waveguide thereon, the waveguide for guiding light propagating therein to exit the waveguide through an end face thereof;
   a first clamp mounted on said base in such a way that said first clamp is capable of being fixed relative to the waveguide secured to said base;
   a first prism secured to said first clamp, for coupling to the waveguide to guide light to enter the waveguide;
   a second clamp mounted on said base in such a way that said second clamp is capable of being alternatively fixed and shifted relative to the waveguide;
   a second prism secured to said second clamp, for coupling to the waveguide so as to guide part of the light propagating through the waveguide to exit the waveguide by way of said second prism;
   prism driving means for driving said second prism alternately (1) to contact the waveguide with a constant force so as to couple said second prism to the waveguide and (2) to separate said second prism from the waveguide so as to be decoupled from the waveguide;
   means for adjusting the distance between said first prism and said second prism;
   a first sensor for detecting the optical power of the light exiting the waveguide by way of said second prism; and
   a second sensor for detecting the optical power of the light exiting the waveguide through the end face.

2. A device as claimed in claim 1, wherein said adjusting means comprises:
   one pair of guide rails formed on said base;
   a first guide means formed in said first clamp and mating with said pair of guide rails, so as to guide movement of said first clamp relative to said base; and
   a second guide means formed in said second clamp and mating with said pair of guide rails, so as to guide movement of said second clamp relative to said base.

3. A device as claimed in claim 2, further comprising:
   a first clamp driving means secured to said base, for driving said first clamp to shift relative to said base and for calculating the shifted distance thereof; and
   a second clamp driving means secured to said base, for driving said second clamp to shift relative to said base and for calculating the shifted distance thereof.

4. A device as claimed in claim 3, further comprising a lens disposed between said first sensor and said second prism, for focusing the light exiting said second prism.

5. A device as claimed in claim 1, wherein said prism driving means is a micrometer.

* * * * *